United States Patent
Howes et al.

(10) Patent No.: US 10,775,052 B2
(45) Date of Patent: Sep. 15, 2020

(54) ZONED RADIANT HEATING SYSTEM AND METHOD

(71) Applicant: Schneider Electric Controls UK Limited, Plymouth, Devon (GB)

(72) Inventors: Ryan Howes, Plymouth (GB); Clive Wilson, Plymouth (GB); Anthony Watters, Plymouth (GB); Matthew Dennis, Plymouth (GB)

(73) Assignee: Schneider Electric Controls UK Limited, Shropshire (GB)

( * ) Notice: Subject to any disclaimer, the term of this patent is extended or adjusted under 35 U.S.C. 154(b) by 303 days.

(21) Appl. No.: 15/807,753

(22) Filed: Nov. 9, 2017

(65) Prior Publication Data

US 2018/0128501 A1    May 10, 2018

Related U.S. Application Data

(60) Provisional application No. 62/419,680, filed on Nov. 9, 2016.

(51) Int. Cl.
*F24D 19/10* (2006.01)
*F24D 3/00* (2006.01)
*G05D 23/19* (2006.01)

(52) U.S. Cl.
CPC .......... *F24D 19/1018* (2013.01); *F24D 3/00* (2013.01); *F24D 2220/0257* (2013.01); *F24D 2220/042* (2013.01); *G05D 23/1917* (2013.01)

(58) Field of Classification Search
CPC ......... F24D 19/1018; F24D 2220/0257; F24D 2220/042

(Continued)

(56) References Cited

U.S. PATENT DOCUMENTS 2,344,991 A * 3/1944 Lilja .................. F24D 19/1018
                                                       236/46 R
3,134,542 A * 5/1964 Smith ................ F24D 19/1018
                                                       237/10

(Continued)

FOREIGN PATENT DOCUMENTS

DE        3643434 A1    6/1988
DE   102011018698 A1   10/2012

(Continued)

OTHER PUBLICATIONS

European Search Report for application No. EP17200558.9 dated Apr. 6, 2018, 11 pgs.

(Continued)

*Primary Examiner* — Steven B McAllister
*Assistant Examiner* — Daniel E. Namay
(74) *Attorney, Agent, or Firm* — Stinson LLP

(57) ABSTRACT

A heating system and method of using such system in a building for zoned radiant heating. The system includes thermostatic radiator valves, each fluidly connected between at least one radiator in a zone of the building and a boiler. A controller is operatively connected to the valves to deactivate the valve positioners when the controller determines that valve activity is likely to have little to no effect on the output of the respective radiator and/or active heating of the building is not desired. For example, the controller determines when the boiler is deactivated and sends a deactivation control signal to the valves operative to prevent the valve positioners from adjusting the respective valve position. In another example, the controller sends the deactivation control signals to the valves at the onset of preprogrammed low usage periods of the heating system.

13 Claims, 4 Drawing Sheets

(58) Field of Classification Search
USPC .................................................. 237/8 A, 2 A
See application file for complete search history.

(56) References Cited

U.S. PATENT DOCUMENTS

| | | | |
|---|---|---|---|
| 8,630,741 B1 | 1/2014 | Matsuoka et al. | |
| 8,659,302 B1 | 2/2014 | Warren et al. | |
| 8,935,110 B2* | 1/2015 | Hsieh | F24D 19/1009 236/22 |
| 9,568,201 B2 | 2/2017 | Fadell et al. | |
| 9,791,839 B2* | 10/2017 | Matsuoka | G05B 15/02 |
| 9,791,871 B1 | 10/2017 | Marschalkowski et al. | |
| 2002/0119003 A1 | 8/2002 | Buschatz et al. | |
| 2006/0279238 A1* | 12/2006 | Lendi | F24D 19/1018 318/139 |
| 2007/0158442 A1 | 7/2007 | Chapman | |
| 2008/0068354 A1 | 3/2008 | Aimi et al. | |
| 2010/0045440 A1 | 2/2010 | Kraiza | |
| 2010/0045470 A1 | 2/2010 | Araiza et al. | |
| 2010/0258194 A1* | 10/2010 | Kim | F24D 19/1015 137/1 |
| 2010/0270385 A1* | 10/2010 | Kim | F24D 19/1015 237/81 |
| 2011/0233290 A1* | 9/2011 | Borovinov | F24D 19/1012 236/93 R |
| 2012/0130547 A1 | 5/2012 | Fadell et al. | |
| 2012/0203379 A1 | 8/2012 | Sloo et al. | |
| 2012/0310373 A1 | 12/2012 | Karaffa et al. | |
| 2013/0025301 A1* | 1/2013 | Maitani | F24D 11/0214 62/79 |
| 2013/0048745 A1* | 2/2013 | Johnson, Jr. | F01K 17/02 237/8 A |
| 2013/0056543 A1* | 3/2013 | Olivotti | G05D 23/1934 237/8 B |
| 2013/0081799 A1* | 4/2013 | Loblich | G05D 23/1934 165/200 |
| 2013/0099009 A1 | 4/2013 | Filson et al. | |
| 2013/0218351 A1 | 8/2013 | Warren et al. | |
| 2013/0221117 A1 | 8/2013 | Warren et al. | |
| 2013/0240172 A1* | 9/2013 | Reilly | G05D 23/1931 165/11.1 |
| 2014/0319232 A1 | 10/2014 | Gourlay | |
| 2014/0326796 A1* | 11/2014 | Kymissis | F24D 19/0087 237/12 |
| 2015/0102120 A1* | 4/2015 | Sorensen | F24D 19/1018 237/8 A |
| 2015/0276237 A1 | 10/2015 | Daniels et al. | |
| 2015/0276238 A1 | 10/2015 | Matsuoka | |
| 2015/0276239 A1 | 10/2015 | Fadell et al. | |
| 2017/0059196 A1 | 3/2017 | Stefanski et al. | |
| 2017/0060149 A1 | 3/2017 | Giustina et al. | |
| 2018/0058705 A1* | 3/2018 | Ha | F24D 19/0056 |
| 2018/0336775 A1* | 11/2018 | Callemo | F25B 30/02 |
| 2019/0346153 A1* | 11/2019 | Morita | F24H 1/52 |

FOREIGN PATENT DOCUMENTS

| | | | | |
|---|---|---|---|---|
| EP | 0282255 A2 | | 9/1988 | |
| EP | 0282255 A2 | | 9/1998 | |
| EP | 1156285 A2 | | 11/2001 | |
| EP | 2114015 A2 | | 1/2010 | |
| EP | 2144015 A2 | | 1/2010 | |
| EP | 2857921 A1 | | 4/2015 | |
| GB | 2161292 A | * | 1/1986 | ......... G05D 23/1912 |
| GB | 2464095 A | | 4/2010 | |
| GB | 2477860 A | | 8/2011 | |
| WO | 2009072744 A2 | | 6/2009 | |
| WO | WO2009072744 A2 | | 6/2009 | |
| WO | 2012068503 A1 | | 5/2012 | |
| WO | WO20120685503 A1 | | 5/2012 | |

OTHER PUBLICATIONS

Extended European Search Report for 17200549.8, dated Mar. 20, 2018.
Extended European Search Report for 17200558.9, dated Apr. 6, 2018.
Partial European Search Report for 17200551.4, dated Apr. 5, 2018.

* cited by examiner

ZONED RADIANT HEATING SYSTEM AND METHOD

CROSS-REFERENCE TO RELATED APPLICATIONS

This application claims priority to U.S. Provisional Patent Application Ser. No. 62/419,680, filed Nov. 9, 2016 and entitled ZONED RADIANT HEATING SYSTEM AND METHOD, which is hereby incorporated by reference in its entirety.

TECHNICAL FIELD

The present disclosure generally relates to a radiant heating system for heating multiple zones in a building and more specifically to a radiant heating system using zoned electronic thermostatic radiator valves that communicate with a system controller.

BACKGROUND

Radiant heating systems include a central heater that is thermally coupled to radiators distributed in different zones of a building. In a conventional radiant heating system, radiators are positioned in different rooms in a residential structure and are operatively coupled to a central boiler. Hot water from the boiler is fed to the radiators to radiantly heat the respective rooms. In a zoned radiant heating system, each radiator is operatively connected to a respective thermostatic valve that opens and closes to control the flow of hot water into the radiator based on the environmental temperature in the respective zone. Traditional thermostatic valves comprise wax motors that open and close due to thermal expansion of a wax material driven by changes in environmental temperature. No other power source is required to open and close the valve. However, because conventional wax valves are only passively responsive to changes in environmental temperature, they are not suitable for centralized system control.

To provide some degree of centralized control to a zoned radiant heating system, electronic thermostatic radiator valves are used instead of wax motors. Unlike wax motors, electronic thermostatic radiator valves have valve positioners that must be powered to open and close the valve. But the thermostatic radiator valves are capable of communicating with a system controller that can control all of the valves to implement a coordinated control scheme to achieve the desired objectives for the system.

SUMMARY

Aspects of the disclosure relate to heating fluid control systems and methods that deactivate electronic thermostatic radiator valves when valve activity is expected to have little or no effect on radiator output and/or active heating of the building is not desired.

In one aspect, a heating system is used for a building. The building comprises a boiler configured to heat heating fluid and at least one radiator in each of a plurality of zones of the building configured to radiantly heat the respective zone using heat of the heating fluid. The heating system comprises at least one valve for each of the plurality of zones. Each valve is fluidly connected between at least one radiator of the respective zone and the boiler. The valve comprises a valve positioner configured to adjust a valve position of the valve to selectively open and close the valve and adjust an amount of the heating fluid provided to the at least one radiator for the respective one of the plurality of zones. A controller is operatively connected to the boiler to determine when the boiler is in a deactivated state and operatively connected to each valve to transmit a deactivation control signal to each valve when the controller determines that the boiler is in the deactivated state. Each valve is configured in response to receiving the deactivation control signal to deactivate the valve positioner such that the valve positioner is prevented from adjusting the respective valve position.

In another aspect, a method of providing separately controlled heating of a plurality of zones in a building comprises, for each of the plurality of zones, thermostatically controlling a valve positioner to adjust a position of a valve and thereby adjust an amount of heating fluid that is provided from a boiler to a radiator in a respective one of the plurality of zones. In response to the boiler being deactivated, each valve is deactivated to prevent the respective valve positioner from adjusting the position of the valve until the boiler is reactivated.

In another aspect, a zoned heating system for a building having at least one radiator in each of a plurality of zones comprises at least one electronic radiator valve for each of the plurality of zones. Each electronic radiator valve is fluidly connected to at least one radiator of the respective zone and is selectively openable and closable to adjust an amount of heating fluid that is provided to the at least one radiator. Each electronic radiator valve comprises a battery and a motor configured to draw power from the battery to adjust a valve position of the valve to selectively open and close the valve. A controller is operatively connected to each electronic radiator valve to transmit control signals to each electronic radiator valve. The controller is configured to determine when periodic predefined low usage times begin and when periodic predefined high usage times begin. The controller is further configured to transmit a deactivation control signal to each electronic radiator valve when the periodic low usage times are determined to begin and to transmit an activation control signal to each electronic radiator valve when the periodic high usage times are determined to begin. The deactivation control signals being configured to prevent the motors of the electronic radiator valves from drawing power from the respective batteries until the radiator valves receive an activation control signal from the controller.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
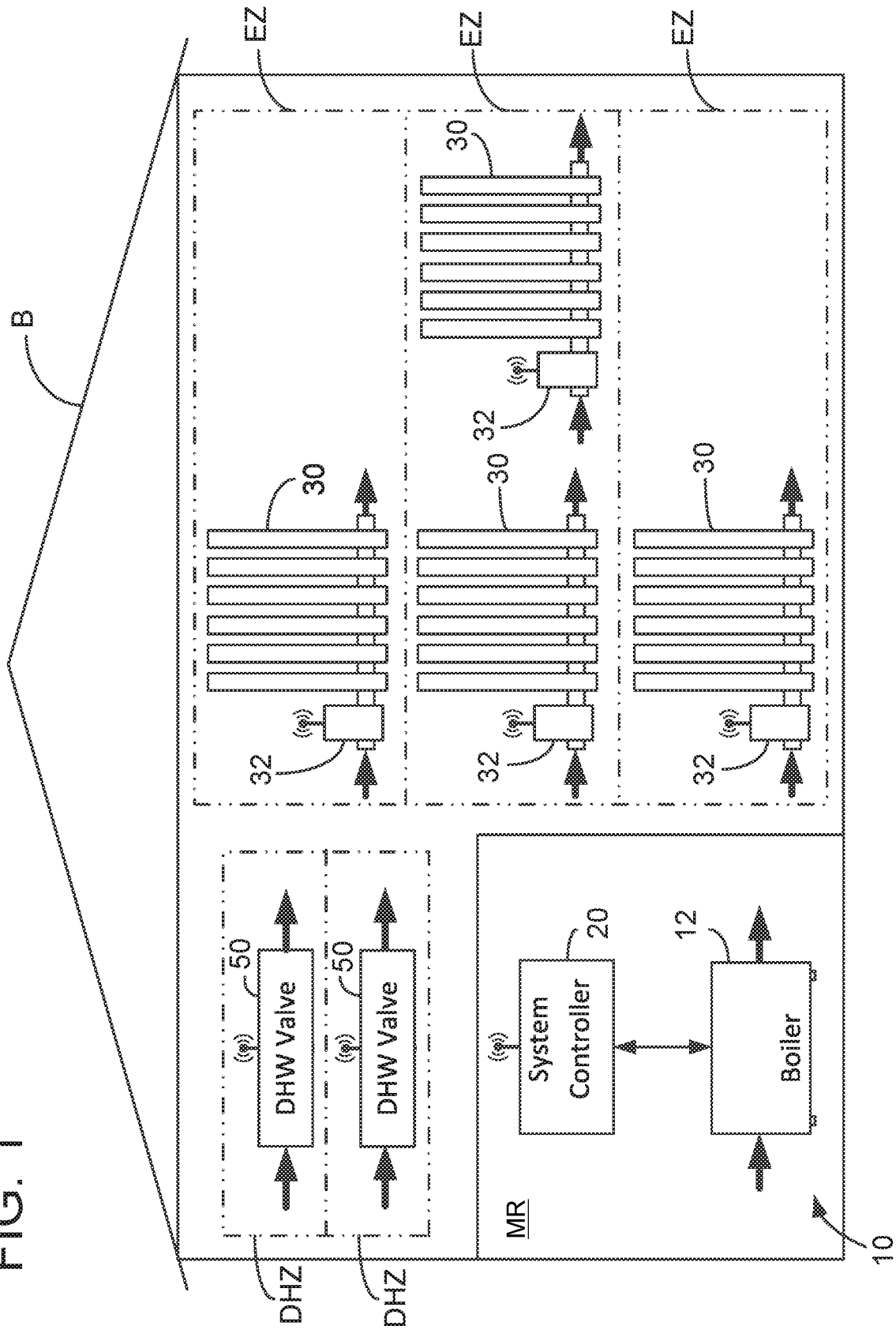
FIG. 1 is a schematic diagram of a zoned radiant heating system.

Referring to FIG. 1, a radiant heating system for providing separately controlled heating of a plurality of environmental zones EZ in a building B is generally indicated at 10. As will be explained in further detail below, the illustrated system 10 implements a centralized control scheme that can be used to enhance energy efficiency when heating the building B. In addition, the system 10 implements control features that reduce the frequency with which a user must undertake routine maintenance tasks to enhance the overall user experience with the system. Below, the major components of the radiant heating system 10 are described in detail before describing certain exemplary implementations of the centralized control scheme.

The system 10 includes a boiler 12 that is fluidly connected to a water supply (not shown). In the illustrated embodiment, the boiler 12 is positioned in a mechanical room MR of the building B, but the boiler can be positioned in any suitable location without departing from the scope of the invention. In the drawings, the flow of water into and out of various components of the system 10, such as the boiler 12, is represented schematically by bold arrows. For clarity, however, FIG. 1 does not illustrate the interconnecting plumbing for the entire system. But one skilled in the art would readily understand how to interconnect the components of the system 10 through conventional plumbing techniques. The boiler 12 is configured to heat water and to supply hot water (broadly, a heating fluid) to various peripheral components of the system 10. As explained below, the boiler 12 is operatively connected to a controller 20 that is configured to send control instructions to the boiler and to determine an operating state of the boiler that the controller uses to control other aspects of the system 10.

Figure 2:
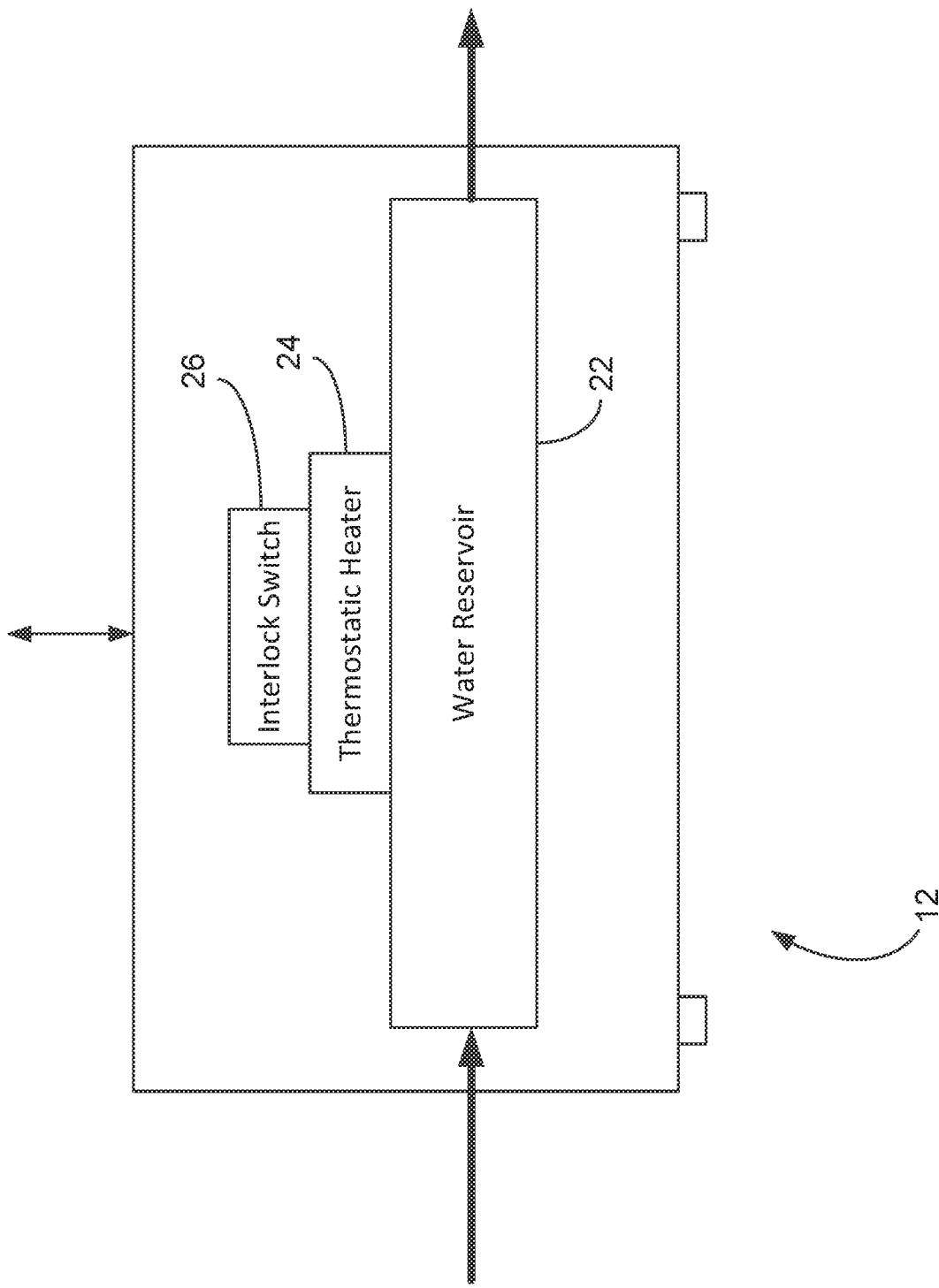
FIG. 2 is an enlarged schematic block diagram of a boiler of the zoned radiant heating system.

Referring to FIG. 2, the illustrated boiler 12 includes a water reservoir 22 and a thermostatic heater 24 thermally coupled to the water reservoir. The water reservoir 22 can be any suitable structure for receiving supply water. For example, in one or more embodiments, the water reservoir 22 comprises a water tank, a water conduit, etc. Suitably, the thermostatic heater 24 comprises a heating element (not shown separately) that is thermally coupled to the reservoir 22 to heat the water. The thermostatic heater 24 is configured to receive heating energy (e.g., gas or electricity) from a heating energy source (not shown) and to convert the heating energy into heat for heating the water in the reservoir 22. Any suitable heating element for heating the water in the reservoir can be used without departing from the scope of the invention. The heater 24 also includes a thermostat (not shown separately) that is configured to sense the temperature of the water and provide feedback control of the heating element whereby the heating element heats the water in the reservoir 22 to a set point temperature.

The illustrated boiler 12 further includes a shutoff switch 26. The shutoff switch 26 is configured to selectively activate and deactivate the boiler 20. In one or more embodiments, when the boiler 20 is activated, the thermostatic heater 24 is connected to a heating energy source such as electrical power or heating fuel for energizing the heating element. In the activated state, the thermostatic heater 24 is operative to maintain the water in the reservoir 22 at the set point temperature. In some embodiments, the heater 24 is disconnected from the heating energy source when it is placed in a deactivated state. For example, a gas valve is shut off or an electrical switch is moved to an off position, etc. In one or more embodiments, the shutoff switch 26 is configured to selectively activate and deactivate the boiler by actuating the gas valve or electrical switch to connect and disconnect the heater 24 from the heating energy source. Other ways of selectively activating and deactivating a boiler can also be used in other embodiments.

Referring again to FIG. 1, the illustrated boiler 12 is operatively connected to the central controller 20 to communicate with the controller. In the illustrated embodiment, the controller 20 is located in the mechanical room MR with the boiler 12. Thus, in the illustrated embodiment, the communications connection between the boiler 12 and the controller 20 is hardwired. In other embodiments, the boiler 12 communicates with the controller 20 using a wireless communications link, such as via a radio frequency connection, a Wi-Fi connection, etc.

The boiler 12 is configured to transmit signals to the controller 20 that are used by the controller to provide centralized control of the radiant heating system 10. In one or more embodiments, the boiler 12 is configured to transmit signals such as a hot water temperature signal representative of a temperature of the water in the reservoir 22 detected by the thermostat of the heater 24. In certain embodiments, the boiler 12 is configured to transmit a boiler activation state signal to the controller representative of whether the boiler 12 is in an activated or deactivated state. For example, when the shutoff switch 26 deactivates the boiler 12, the boiler transmits a deactivation state signal to the controller 20; and when the boiler is activated, it sends an activation signal to the controller. In other embodiments, the controller 20 is solely responsible for controlling the activation state of the boiler 12, such that the controller can determine the activation state of the boiler without receiving a signal from the boiler. The boiler 12 can transmit a signal to the controller 20 periodically, continuously, or only at the occurrence of a boiler state change. The controller 20 can be configured to receive the signals transmitted by the boiler and to use them in a centralized control scheme as described in further detail below.

The controller 20 is likewise configured to transmit control signals to the boiler 12 that control adjustments to the boiler. In suitable embodiments, the controller 20 includes a user interface for receiving user inputs for adjusting a parameter of the boiler 12 and/or other peripheral components of the radiant heating system 10. The user interface, in certain embodiments, comprises a local user interface mounted at the same location as the controller 20 and/or a remote user interface (not shown; e.g., a mobile device, etc.) that is remotely connected to the controller for transmitting a user input to the controller. For example, in one or more embodiments, a user provides a user input to the controller 20 for adjusting the set point temperature of the boiler 12. After receiving the user input, the controller 20 transmits a boiler set point temperature control signal to the boiler 12 configured to adjust the set point temperature of the thermostatic heater 24. The controller 20 is further configured to transmit other boiler control signals to the boiler 12. For example, in the illustrated embodiment, the controller 20 is configured to transmit a boiler deactivation control signal to the boiler 12 as discussed in further detail below. In response to receiving the boiler deactivation control signal, the shutoff switch 26 is configured to automatically switch the boiler 12 into the deactivated state, inhibiting the boiler from drawing heating energy to heat the water in the reservoir tank 22. The controller 20 is also configured to transmit a boiler activation control signal to the boiler 12. When the boiler 12 receives the boiler activation control signal, the shutoff switch 26 automatically switches the boiler to the activated state, allowing the boiler to draw heating energy for heating the water in the reservoir 22. The controller transmits still other boiler control signals to the boiler in other embodiments.

Referring still to FIG. 1, the radiant heating system 10 includes one or more radiators 30 positioned in each environmental zone EZ for heating the respective environmental zone. In the illustrated embodiment, the building B includes three environmental zones EZ. One environmental zone EZ includes two radiators 30 and the other two environmental zones include one radiator each. It will be understood that the radiant heating system can be used with buildings having other numbers of environmental zones or other numbers of radiators in each zone without departing from the scope of the invention. The radiators 30 are selectively coupled to the boiler 12 to receive the hot water from the boiler. The radiators 30 are configured to convey radiant heat from the hot water to the respective environmental zones EZ.

Figure 3:
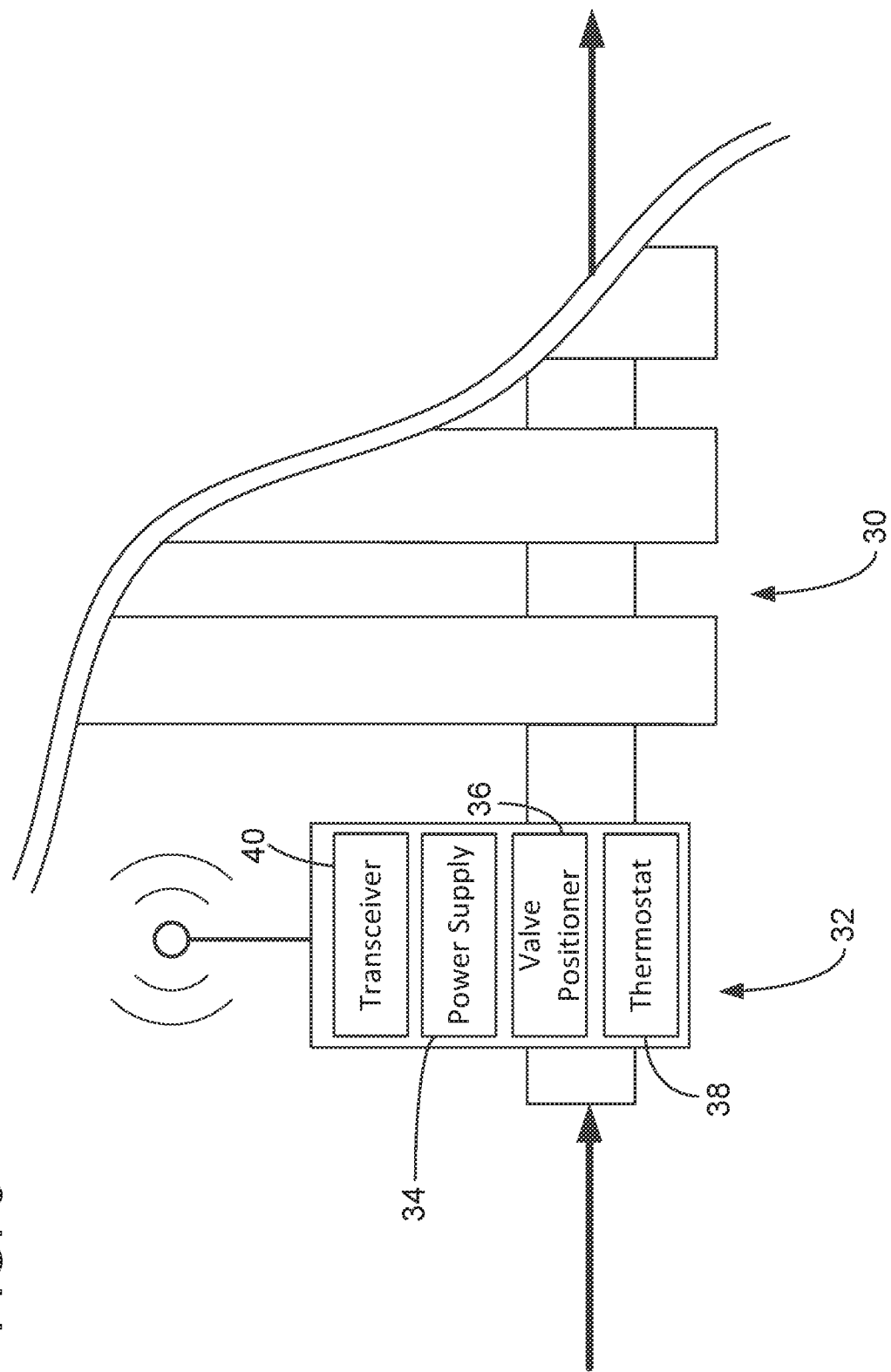
FIG. 3 is an enlarged fragmentary schematic block diagram of a radiator and a radiator valve of the zoned radiant heating system.

Each environmental zone EZ includes at least one thermostatic radiator valve 32 configured to control the amount of hot water from the boiler 12 that is supplied to the radiators 30 in the zone. In the illustrated embodiment, each radiator 30 has its own valve 32, but in other embodiments, a single valve can be used to control the flow of hot water to more than one radiator in a respective environmental zone EZ. Referring to FIG. 3, each of the illustrated radiator valves 32 is an electronic thermostatic radiator valve.

The radiator valve 32 includes a power supply 34 that is operatively connected to an electronic valve positioner 36. The valve positioner 36 is configured to selectively adjust to the position of a valve body to open and close the radiator valve 32. For example, in one embodiment, the valve positioner 36 comprises an electric motor and the power supply 34 comprises a battery. The electric motor 36 draws power from the power supply 34, which drives the motor to adjust the position of the valve body to open and close the valve 32. In certain embodiments, the valve positioner 36 operates in a binary manner. That is, the valve positioner 36 is configured to position the valve in one of a fully opened position or a fully closed position. In other embodiments the valve positioner 36 is configured for fine adjustments of the valve position. For example, the valve positioner 36 can adjust the valve to a fully opened position, a fully closed positioned, and one or more positions between the fully opened position and fully closed position. One skilled in the art will appreciate that controlling when and the extent to which the radiator valve 32 is opened controls the supply of hot water to the radiator 30 and thus the temperature of the respective environmental zone EZ.

The electronic thermostatic radiator valve 32 is configured to locally maintain the temperature of the respective environmental zone EZ at a set point temperature. The radiator valve 32 includes a thermostat 38 that is configured to sense the temperature of the respective environmental zone EZ at the radiator valve and provide feedback control of the valve positioner 36. For example, when the thermostat 38 detects a temperature in the environmental zone EZ that is below the set point temperature, the thermostat controls the valve positioner 36 to open the valve 32 and allow more hot water to flow through the radiator 30. When the thermostat 38 detects a temperature in the environmental zone EZ that is at or above the set point, it controls the valve positioner 36 to close the valve 32 and restrict or prevent the flow of additional hot water into the radiator 30. By selectively controlling the flow of hot water from the boiler 12 into and through the radiator 30, the thermostat 38 can maintain the environmental zone at about a predetermined set point temperature.

Each electronic thermostatic radiator valve 32 is operatively connected to the central controller 20 to communicate with the controller. In the illustrated embodiment, the controller 20 is located in the mechanical room MR remote from at least some of the radiator valves 32 in the respective environmental zones EZ. To lower the cost of setting up the radiant heating system 10, in certain embodiments, a wireless communications protocol is used to establish a connection between the radiator valves 32 and the controller 20. The illustrated radiator valve 32 therefore includes a wireless transceiver 40 for exchanging signals with the controller 20. In a suitable embodiment, the transceiver 40 communications with the controller 20 using an RF connection, but other types of wireless connections (e.g., Wi-Fi, etc.) or a wired connection can also be used in other embodiments.

Each radiator valve 32 is configured to transmit signals to the controller 20 that are used in the centralized control scheme for the radiant heating system 10. In one or more embodiments, each radiator valve 32 is configured to transmit a radiator demand signal to the controller 20 representative of the respective radiator's demand for hot water from the boiler 12, which is broadly indicative of the radiator's demand on the system 10. For example, when a radiator valve 32 is closed, the respective radiator 30 has zero demand on the system 10, so the transceiver 40 transmits a zero demand signal to the controller 20. When the radiator valve 32 is partially or fully opened, however, the demand of the radiator 30 for hot water increases, and the transceiver 40 transmits a non-zero demand signal to the controller 20. In one or more embodiments, the non-zero demand signal varies with the amount of demand that the radiator 30 is placing on the system 10. The transceiver 40 can transmit the radiator demand signal to the controller 20 periodically, continuously, or only at the occurrence of a radiator demand change. Radiator demand changes with valve position, and thus a valve position signal can be used as a radiator demand signal. The radiator valve 32 can also be configured to transmit other signals to the controller 20, such as an environmental temperature signal representative of a temperature of the respective environmental zone EZ detected by the thermostat 38. The controller 20 is configured to receive the signals transmitted by the transceiver 40 and to use them in a centralized control scheme as described in further detail below.

In addition, the controller 20 is configured to transmit control signals to the radiator valve 32 that are used to make adjustments to the valve. As explained above, the controller 20 includes a user interface for receiving user inputs. A user can provide a user input to the controller 20 for adjusting the set point temperature of a specified environmental zone EZ. After receiving the user input, the controller 20 transmits an environmental zone set point temperature control signal to the transceiver 40, and the electronic radiator valve 32 adjusts the set point temperature of the thermostat 38. It is also understood that, in some embodiments, the electronic thermostatic radiator valve 32 has a local user interface (not shown) for adjusting the environmental set point temperature. In the illustrated embodiment, the controller 20 is configured to transmit other radiator valve control signals to the electronic radiator valve 32 in addition to set point temperature controls. For example, the controller 20 is configured to transmit a valve positioner deactivation control signal to the thermostatic radiator valve 32 as discussed in further detail below. In response to receiving the valve positioner deactivation control signal, the radiator valve 32 is configured to deactivate the valve positioner 36 such that valve positioner is inhibited from drawing power from the power supply 34 for adjusting the position of the valve. The controller 20 is also configured to transmit a valve positioner activation control signal to the radiator valve 32. In response to receiving the valve positioner activation control signal from the controller 20, the valve 32 is configured to activate the valve positioner 36 whereby the valve positioner is enabled to selectively draw power from the power supply 34 to selectively open and close the valve.

Referring again to FIG. 1, the illustrated heating system 10 further includes domestic hot water supply valves 50 that are fluidly connected to the boiler 12 to receive hot water from the boiler. It is understood that the heating system 10 could be used separately from the domestic hot water supply system of a building B in other embodiments. As is known in the art, each domestic hot water supply valve 50 is configured to control the supply of hot water from the boiler 12 to one or more water fixtures (not shown) in a respective domestic hot water zone DHZ within the building B. The domestic hot water supply valves 50 are operatively connected to the system controller 20 to communication with the controller. In the illustrated embodiment, the domestic hot water supply valves 50 are connected to the controller 20 wirelessly by an RF connection. In other embodiments, the domestic hot water supply valves are connected using other types of connections.

Suitably, the domestic hot water supply valves are configured to transmit a domestic hot water demand signal to the controller 20 representative of the demand from the respective domestic hot water zone DHZ for hot water from the boiler 12. For example, when a domestic hot water valve 50 is closed, the respective domestic hot water zone DHZ has zero demand on the system 10, so the valve 50 transmits a zero domestic hot water demand signal to the controller 20. When the valve 50 is partially or fully opened, however, the demand from the domestic hot water zone DHZ is increased and the valve 50 transmits a non-zero domestic hot water demand signal to the controller 20. The valve 50 can transmit the domestic hot water demand signal to the controller 20 periodically, continuously, or only at the occurrence of a demand change. The controller 20 is configured to receive the signals transmitted by the valves 50 and to use them in a centralized control scheme as described in further detail below. The domestic hot water valve 50 can also be configured to transmit other signals to the controller 20, and the controller 20 can be configured to transmit control signals to the domestic hot water valves.

A suitable method of using the radiant heating system 10 will now be described. Initially, the components of the system 10 must be installed in the building B. In a typical installation, the building B will have a preexisting boiler 12, radiators 30, and plumbing connecting the boilers to the radiators. The radiators 30 may be operatively connected to non-electronic thermostatic radiator valves. To implement the system 10 in the building B, the installer mounts the controller 20 at a suitable location within the building (typically, in the mechanical room MR with the boiler 12) and connects the controller to the boiler 12. If the existing boiler 12 does not have a shutoff switch 26, one can be installed or the boiler 12 can be replaced with a new boiler that is fitted with a shutoff switch. The installer replaces each of the non-electronic thermostatic radiator valves in the preexisting system with the electronic thermostatic radiator valves 32 and establishes a wireless connection between each valve and the controller 20. Likewise, if applicable, the installer installs the domestic hot water valves 50 and establishes a wireless connection with the controller 20.

Once the necessary connections have been made, the user or installer can set the control parameters for the system 10. In general, the controller 20 will be installed with preset default control parameters, but these can be adjusted to suit a particular user's desires. Among other control parameters, the system 10 allows the user to select a desired environmental set point temperature for each environmental zone EZ and to define low and high usage times at which the system automatically adjusts the amount of energy it is using to provide heating. Using the user interface for the controller 20, the user can provide user inputs that set the desired environmental set point temperature for each environmental zone EZ. The user can also use a user interface local to the respective radiator valve 32 to set and adjust the environmental set point temperature for the respective environmental zone EZ in some embodiments. The user can further provide user inputs the user interface associated with the controller 20 to set the low and high usage times for the system. For example, if there are standard hours during which no person is typically present in the building B or all people present in the building are asleep, the user can set these times to be low usage and set all other times to high usage. As explained below, the controller 20 automatically adjusts the system 10 to use less energy during the low usage times and to provide optimal heating during high usage times.

After the system 10 is set up, the controller 20 and the electronic thermostatic radiator valves 32 automatically control the heating of the environmental zones EZ. During high usage times, the controller 20 allows the boiler 12 to operate in an activated state. The thermostats 38 control the valve positioners 36 to open and close the radiator valves 32 and selectively convey hot water from the boiler 12 to the respective radiator 30. When additional heat is required in an environmental zone EZ, the radiator valve(s) 32 in the zone opens. Thus, the respective radiator(s) place a non-zero or positive radiator demand on the system 10. The boiler 12 feeds hot water to the respective radiator 30 through the open valve 32. When the temperature in the environmental zone EZ is at or above the set point temperature, the valve 32 closes. With the valve 32 closed, the radiator 30 places zero radiator demand on the system 10. Meanwhile, as domestic hot water is needed in each domestic hot water zone DHW, the domestic hot water valves 50 open and place domestic hot water demand on the system 10. In the activated state, the boiler 12 meets all of the radiator demand and domestic hot water demand as it is placed on the system 10.

Figure 4:
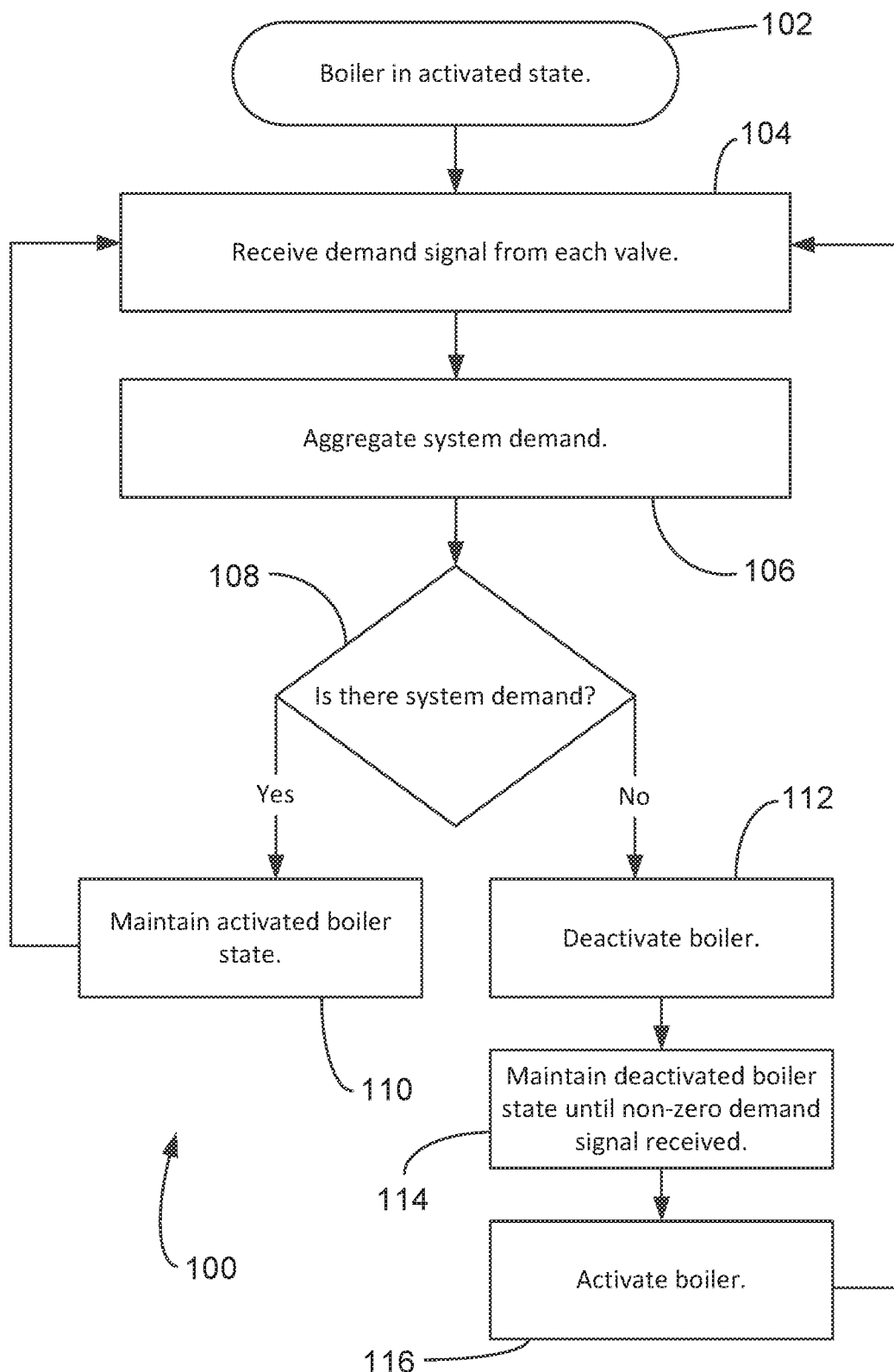
FIG. 4 is a flow chart illustrating the steps and decision blocks of a method of operating the radiant heating system to conserve energy.

Referring to FIG. 4, the controller 20 is configured to selectively deactivate the boiler 12, even during high usage times, to minimize the total energy usage of the system 10. In an exemplary method 100, the boiler 12 begins in an activated state (starting block 102). The boiler shutoff switch 26 is turned on so that the boiler 12 can draw heating energy to heat the water in the reservoir 22. With the boiler in the activated state, at step 104, the controller 20 receives a demand signal from each of the radiator valves 32 and domestic hot water valves 50 (if applicable). At step 106, the controller aggregates the demand signals to determine the total aggregate demand on the system 10. Based on the aggregated system demand determined in step 106, at decision block 108, the controller determines whether there is any aggregated system demand.

In the illustrated embodiment, when the demand signal for each of the valves 32, 50 is a zero demand signal, the controller 20 determines that the total aggregated demand on the system 10 is zero. When the demand signal for at least one of the valves 32, 50 is non-zero, the controller 20 determines that the aggregated system demand is non-zero. It will be understood that other signals representative of demand for hot water can be combined with the signals from the radiator valves 32 and domestic hot water valves 50. For example, in one or more embodiments, each environmental zone can include one or more room sensors (not shown) (e.g., environmental temperature sensors, etc.), and the controller 20 can be configured to evaluate the aggregated system demand using these additional signals. Still other signals representative of sources of demand for hot water can be used in to determine aggregated system demand.

After determining that there is non-zero demand on the system 10, the controller 20 maintains the boiler 12 in the activated state (step 110). But when the controller 20 determines that the aggregated system demand is zero, at step 112, the controller 20 deactivates the boiler 12. More specifically, the controller 20 transmits a deactivation control signal to the boiler 12 that causes the shutoff switch 26 to switch to the off position. In the off position, the shutoff switch 26 prevents the boiler 12 from drawing heating energy to heat the water in the reservoir 12. After deactivating the boiler 12, the controller 20 operates the system 10 with the boiler 12 in the deactivated state until it receives a non-zero demand signal from one of the valves 32, 50 (step 114). When one of the valves 32, 50 opens, the controller 20 receives a non-zero demand signal from the valve and at step 116 activates the boiler. As shown in FIG. 4, any time the boiler is activated, the method 100 proceeds to step 102 such that the controller continues to receive demand signals from the valves 32, 50 when the boiler 12 is activated.

As can be seen, the method 100 provides an automated process for minimizing total energy use and thus maximizing the energy efficiency of the system 10. The controller 20 creates an interlock between the valves 32, 50 and the boiler shutoff switch that automatically shuts the boiler 12 off when there is no system demand for hot water. Energy use is minimized by prohibiting the boiler 12 from drawing heating energy when the aggregate system demand is zero. Because of the communication connections between the valves 32, 50 and the controller 20, the controller is able to evaluate aggregate system demand and make immediate adjustments to the boiler to ensure it both is available when system demand is present and does not draw unnecessary energy when there is zero aggregate system demand.

Referring to FIGS. 1 and 3, the system 100 is further configured to operate the electronic thermostatic radiator valves 32 in an energy efficient manner. As discussed above, during certain predefined low use times, the controller 20 is configured to deactivate the boiler 12. While the boiler 12 is deactivated, any valve activity wastes power from the power supply 34 because opening and closing the valve 32 has a negligible heating effect on the respective environmental zone EZ when the boiler is not producing hot water. However, since radiator valves operate based on local thermostatic control regardless of the activation state of the boiler, in a conventional system the local thermostat would continue to control the valve positioner based on the detected local temperature and the valve positioner would continue to draw power from the power supply to open and close the valve.

Unlike a conventional electronic radiant heating system, in the illustrated heating system 10, the controller 20 is configured to deactivate the radiator valves 32 whenever the boiler 12 is deactivated. In general, the controller 20 functions to determine the activation state of the boiler 12. In the illustrated embodiment, the controller 20 directly controls the position of the shutoff switch 26 and thus is intrinsically aware of the activation state of the boiler 12 (i.e., whether the shutoff switch is switched on or off). In other embodiments, the controller 20 receives activation state signals from the boiler 12 and determines the activation state of the boiler based on the received signals. In either instance, when the controller 20 determines that the boiler 12 has been deactivated, it transmits a deactivation control signal to each of the radiator valves 32. In response, each valve 32 deactivates the valve positioner 36 such that the valve positioner is prevented from drawing power from the power supply 34 to adjust the position of the valve. In one embodiment, the valve 32 simply maintains its current valve position after receiving the valve deactivation signal. In another embodiment, the valve positioner 36 fully closes any open valve 32 and subsequently maintains the valve in the closed state. In either case, after receiving the valve deactivation signal from the controller 20, the valve positioner 36 is prevented from drawing power from the power supply while the boiler 12 is deactivated.

After the low usage period has expired, the controller 20 switches the shutoff switch 26 back to the on position to activate the boiler 12. In response, the controller 20 sends a valve activation signal to each of the radiator valves 32. When the radiator valves 32 receive the valve activation signals, they activate the valve positioners 36, allowing the valve positioners to draw power from the power supplies 34 to open and close the valves. After a valve 32 is reactivated, the thermostat 38 reconvenes local control of the valve positioner 36 to maintain the environmental zone at the desired set point temperature.

As can be seen, the illustrated system is configured to minimize the amount of power that is drawn from the valve power supplies 34 when hot water is not being produced. Since the power supplies 34 are typically batteries that must be periodically recharged or replaced, minimizing the rate at which the power is drawn down helps maximize the total life of the batteries. Maximizing battery life makes replacements and/or recharges less frequent, which lowers cost and makes the system 10 more user friendly.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained. As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A heating system for a building comprising a boiler configured to heat heating fluid and at least one radiator in each of a plurality of zones of the building configured to radiantly heat the respective zone using heat of the heating fluid, the boiler having a shutoff switch associated therewith configured to selectively activate and deactivate the boiler, the heating system comprising:

at least one electronic thermostatic valve configured for local thermostatic control for each of the plurality of zones, each valve being fluidly connected between at least one radiator of the respective zone and the boiler, the valve comprising a valve positioner configured to adjust a valve position of the valve to selectively open and close the valve and adjust an amount of the heating fluid provided to the at least one radiator for the respective one of the plurality of zones; and a controller operatively connected to the boiler and configured to receive a deactivation state signal transmitted by the boiler when a shutoff switch associated therewith deactivates the boiler and an activation state signal transmitted by the boiler when the shutoff switch associated therewith activates the boiler, the controller further configured to determine when the boiler is in a deactivated state in response to receiving the deactivation state signal and operatively connected to each valve to transmit a deactivation control signal to each valve when the controller determines that the boiler is in the deactivated state, each valve being configured in response to receiving the deactivation control signal to deactivate the valve positioner such that the valve positioner is prevented from adjusting the respective valve position wherein local thermostatic control of each valve is interrupted when the valve is deactivated in response to receiving the deactivation control signal, and the controller further configured to determine when the boiler transitions from the deactivated state to an activated state in response to receiving the activation state signal and operatively connected to each valve to transmit an activation control signal to each valve when the controller determines that the boiler has transitioned from the deactivated state to the activated state, each valve being configured in response to receiving the activation control signal to activate the valve positioner such that the valve positioner is enabled to adjust the respective valve position.

2. A heating system as set forth in claim 1 wherein the valve positioner comprises a battery and an electric motor configured to draw power from the battery to adjust the valve position.

3. A heating system as set forth in claim 2 wherein the motor is restricted from drawing power from the battery when the respective valve is in the deactivated state.

4. A heating system as set forth in claim 1 wherein in response to receiving the deactivation control signal the valve positioner of each valve is configured to close the valve before deactivating the valve.

5. A heating system as set forth in claim 1 wherein the controller is configured to periodically deactivate the boiler during predefined low usage times.

6. A heating system as set forth in claim 1 wherein the valve positioner is configured to be controlled by local thermostatic control when the valve is activated.

7. A heating system as set forth in claim 1 wherein the controller is configured to transmit boiler activation and deactivation signals to the boiler operative to activate and deactivate the boiler.

8. A heating system as set forth in claim 1 wherein the controller is operatively connected to at least one of the valves by a wireless communications link.

9. A heating system as set forth in claim 1 further comprising said boiler.

10. A method of providing separately controlled heating of a plurality of zones in a building, the building having a boiler configured to heat heating fluid and at least one radiator in each of the plurality of zones of the building configured to radiantly heat the respective zone using heat of the heating fluid, the boiler having a shutoff switch associated therewith configured to selectively activate and deactivate the boiler, the method comprising:

for each of the plurality of zones, thermostatically controlling a valve positioner to adjust a position of a valve for local thermostatic control and thereby adjust an amount of the heating fluid that is provided from the boiler to the radiator in a respective one of the plurality of zones, each valve being fluidly connected between at least one radiator of the respective zone and the boiler, the valve comprising the valve positioner configured to adjust the position of the valve to selectively open and close the valve;

receiving, by a controller operatively connected to the boiler, a deactivation state signal transmitted by the boiler when a shutoff switch associated therewith deactivates the boiler and an activation state signal transmitted by the boiler when the shutoff switch associated therewith activates the boiler;

determining, by the controller, when the boiler is in a deactivated state in response to receiving the deactivation state signal;

transmitting, by the controller, a deactivation control signal to each valve when the controller determines that the boiler is in the deactivated state;

in response to the deactivation control signal, deactivating each valve to prevent the respective valve positioner from adjusting the position of the valve until the boiler is reactivated wherein local thermostatic control of each valve is interrupted when the valve is deactivated in response to receiving the deactivation control signal;

determining, by the controller, when the boiler transitions from the deactivated state to an activated state in response to receiving the activation state signal;

transmitting, by the controller, an activation control signal to each valve when the controller determines that the boiler has transitioned from the deactivated state to the activated state; and in response to the activation control signal, activating each valve to enable the respective valve positioner to adjust the position of the valve and provide local thermostatic control of each valve.

11. A method as set forth in claim 10 wherein the step of deactivating each valve comprises inhibiting a motor of the respective valve positioner from drawing power from a battery of the valve positioner.

12. A method as set forth in claim 10 further comprising periodically deactivating the boiler during predefined low usage times.

13. A zoned heating system for a building having a boiler configured to heat heating fluid and at least one radiator in each of a plurality of zones configured to radiantly heat the respective zone using heat of the heating fluid, the boiler having a shutoff switch associated therewith configured to selectively activate and deactivate the boiler, the zoned heating system comprising:

at least one electronic radiator valve configured for local thermostatic control for each of the plurality of zones, each electronic radiator valve being fluidly connected to at least one radiator of the respective zone and being selectively openable and closable to adjust an amount of heating fluid that is provided to the at least one radiator from the boiler, each electronic radiator valve comprising a battery and a motor configured to draw power from the battery to adjust a valve position of the valve to selectively open and close the valve; and a controller operatively connected to each electronic radiator valve to transmit control signals to each electronic radiator valve, the controller being configured to determine when periodic predefined low usage times begin and when periodic predefined high usage times begin, the controller being further configured to receive a deactivation state signal transmitted by the boiler when a shutoff switch associated therewith deactivates the boiler and an activation state signal transmitted by the boiler when the shutoff switch associated therewith activates the boiler, the controller further configured to determine when the boiler is in a deactivated state in response to receiving the deactivation state signal and when the boiler transitions from the deactivated state to an activated state in response to receiving the activation state signal, the controller operatively connected to each electronic radiator valve to transmit a deactivation control signal to each electronic radiator valve when the periodic low usage times are determined to begin or when the controller determines that the boiler is in the deactivated state and to transmit an activation control signal to each electronic radiator valve when the periodic high usage times are determined to begin or when the controller determines that the boiler has transitioned from the deactivated state to the activated state, the deactivation control signals being configured to prevent the motors of the electronic radiator valves from drawing power from the respective batteries until the radiator valves receive an activation control signal from the controller wherein local thermostatic control of each valve is interrupted when the electronic radiator valves are deactivated in response to receiving the deactivation control signal.

* * * * *